(12) United States Patent
Chang

(10) Patent No.: US 7,054,984 B2
(45) Date of Patent: May 30, 2006

(54) STRUCTURE AND METHOD FOR EXTENDED BUS AND BRIDGE IN THE EXTENDED BUS

(75) Inventor: Nai-Shung Chang, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 469 days.

(21) Appl. No.: 09/922,046

(22) Filed: Aug. 3, 2001

(65) Prior Publication Data

US 2004/0225784 A1    Nov. 11, 2004

Related U.S. Application Data

(60) Provisional application No. 60/225,018, filed on Aug. 11, 2000.

(30) Foreign Application Priority Data

Mar. 12, 2001    (TW) .............................. 90105671 A

(51) Int. Cl.
*G06F 13/36*    (2006.01)
(52) U.S. Cl. ...................... 710/306; 710/305
(58) Field of Classification Search ................ 710/100, 710/305, 306
See application file for complete search history.

(56) References Cited

U.S. PATENT DOCUMENTS

| | | | | |
|---|---|---|---|---|
| 5,857,086 A * | 1/1999 | Horan et al. | ................ | 710/306 |
| 5,889,970 A * | 3/1999 | Horan et al. | ................ | 710/312 |
| 5,892,964 A * | 4/1999 | Horan et al. | .................. | 712/33 |
| 6,070,207 A * | 5/2000 | Bell | .......................... | 710/302 |
| 6,523,082 B1 * | 2/2003 | Yoshida | ...................... | 710/313 |
| 6,670,958 B1 * | 12/2003 | Aleksic et al. | .............. | 345/502 |
| 6,789,154 B1 * | 9/2004 | Lee et al. | ................... | 710/315 |

\* cited by examiner

*Primary Examiner*—Tim Vo
(74) *Attorney, Agent, or Firm*—J.C. Patents

(57) ABSTRACT

A structure and a method for an extended bus and a bridge in the extended bus are disclosed. The structure of the extended bus has a first accelerated graphics port bus, a first bridge, a second accelerated graphics port bus and a first extended bus. The first bridge performs a compatible mutual conversion of the signal and data between the first accelerated graphics port bus and the first extended bus or the second accelerated graphics port bus, so that the first accelerated graphics port bus is extended for use. The invention extends and expands the current available high-speed and wide-bandwidth accelerated graphics port bus to obtain one or more extended buses. The data path through the south bridge chip is thus avoided. Furthermore, more expansion slots are provided to the system, and the flexibility of expanding the computer system is increased.

6 Claims, 3 Drawing Sheets

STRUCTURE AND METHOD FOR EXTENDED BUS AND BRIDGE IN THE EXTENDED BUS

CROSS-REFERENCE TO RELATED APPLICATION

This application claims the priority benefit of U.S. provisional application Ser. No. 60/225,018, filed Aug. 11, 2000, and Taiwan application serial no. 90105671, filed Mar. 12, 2001.

BACKGROUND OF THE INVENTION

1. Field of the Invention

The present invention pertains to the field of accelerated graphics port (AGP) bus. More particularly, the invention relates to a structure and method to expand an accelerated graphics port bus to obtain various extended buses.

2. Description of the Related Art

Early stages, the graphic display card is settled in a system bus such as a PCI bus. As the bandwidth of the system bus is narrow and various input/output peripherals may use such a system, the system bus cannot be applied to multimedia application. The high-speed graphic card that settled in the special accelerated graphics is thus developed. The high-speed graphic card normally includes accelerated graphic processor.

FIG. 1 shows a block diagram of conventional computer system. The central processing unit 10 is coupled to the PCI bus 14 via the chip set 12. The chip set 12 includes a South Bridge chip 15 and a North Bridge chip 18. The South Bridge chip 15 and the North Bridge chip 18 are coupled operating via a VLINK bus 17. The PCI bus is coupled to the PCI compatible PCI peripherals 16. Each of the PCI peripheral devices 16 outputs a request signal REQ to request use of the PCI bus 14. Then, the arbiter in the chip set outputs a grant signal GNT to the main controller to allow use. The peripheral devices 16 obtaining the control of the PCI bus 14 then accesses the memory 11 via the chip set 12. Additionally, the system uses a special accelerated graphics port bus to access the accelerated graphic processor 13.

The above structure can meet the requirements of high speed and wide bandwidth of the accelerated graphic processor 13. However, in the high-frequency era, each peripheral device 16 inputs/outputs huge amounts of data at a high speed. These peripheral devices 16 have to access the memory 11 through the South Bridge chip 15, the VLINK bus 17 and the North Bridge chip 18. The South Bridge chip 15 can hardly manage the processing amount, especially being limited by the VLINK bus 17, not to mention further expansion.

SUMMARY OF THE INVENTION

In a form of the present invention, a structure is provided for extending and expanding the current accelerated graphics port bus with a large bandwidth. One or a plurality of extended buses is used to avoid a data path through the south bridge chip. More expansion slots are provided in the system, more flexible expansion of the computer system becomes. The structure can be applied to servers requiring various high-speed peripheral devices.

The structure of the extended bus comprises at least a first accelerated graphic port bus, a first bridge and a first extended bus. The first bridge is coupled to both the first accelerated graphics bus port and the first extended bus. The signal and data between the first accelerated graphics port bus and the first extended bus can thus be compatibly converted with each other. Therefore, the first accelerated graphics port bus can be expanded, and the first extended bus is obtained. In most of the applications, the structure may further comprise a second accelerated graphics port bus coupled to the first bridge. The first bridge then compatibly converts and buffers the data and signal between the first accelerated graphics port bus and the second accelerated graphics port bus, so that the computer system may retain use of the accelerated graphics port bus.

In another form of the invention, a second extended bus is provided. The above first bridge compatibly converts the data and signal between the first accelerated graphics port bus and the second extended bus, and an additional extended bus is added. The extended buses include PCI buses. In one embodiment of the invention, the first bridge can be connected to a second bridge in series, so that the usage of the second accelerated graphics port bus can be expanded to obtain a third or a fourth extended bus or a third accelerated graphics port bus.

In another form of the invention, a bridge expands the first accelerated graphics bus to obtain the first extended bus. The bridge comprises at least a main accelerated graphics port controller, a first extended bus controller and a flow controller. The main accelerated graphics controller connected to the first accelerated graphics port bus is used to receive compatibly and to transmit the data and signal of the first accelerated graphics port bus. The flow controller is coupled to both the main accelerated graphics port bus and the first extended bus controller to arbitrate and control the flow direction of these controllers. In most of the application, the bridge may further expand the first accelerated graphics port bus to obtain a second accelerated graphics port bus. Therefore, the bridge further comprises an extended accelerated graphics port controller coupled to the second accelerated graphics port bus and the flow controller to compatibly receive or transmit the data and signal of the second accelerated graphics port bus. The above flow controller arbitrates and controls the flow direction of data and signal of all the controllers coupled thereto.

A method for extending a bus is provided by the invention. The first accelerated graphics port bus is expanded in this method. An extended bus is provided. The data and signal between the first accelerated graphics port bus and the extended bus are compatibly and mutually converted. In most applications, the method further comprises the following steps. A second accelerated graphics port bus is provided. The data and signal between the first accelerated graphics bus and the second accelerated graphics bus are compatibly and mutually converted.

Since the accelerated graphics port bus with a large bandwidth is coupled to the North Bridge chip, the data path does not go through the south bridge and the VLINK bus. The PCI bus is thus not affected and more expansion slots are provided to the computer system.

Both the foregoing general description and the following detailed description are exemplary and explanatory only and are not restrictive of the invention, as claimed.

BRIEF DESCRIPTION OF THE DRAWINGS

Other features and advantages of the present invention will be come apparent by reference to the following detailed description when considered in conjunction with the accompanying drawings, in which.

DESCRIPTION OF THE PREFERRED EMBODIMENTS

Aspects of the present invention include methods and apparatus for designing an integrated circuit. In the following description, specific information is set forth to provide a thorough understanding of the present invention. Well-known circuits and devices are included in block diagram form in order to not to complicate the description unnecessarily. Moreover, it will be apparent to one skill in the art that specific details of these blocks are not required in order to practice the present invention.

Figure 1:
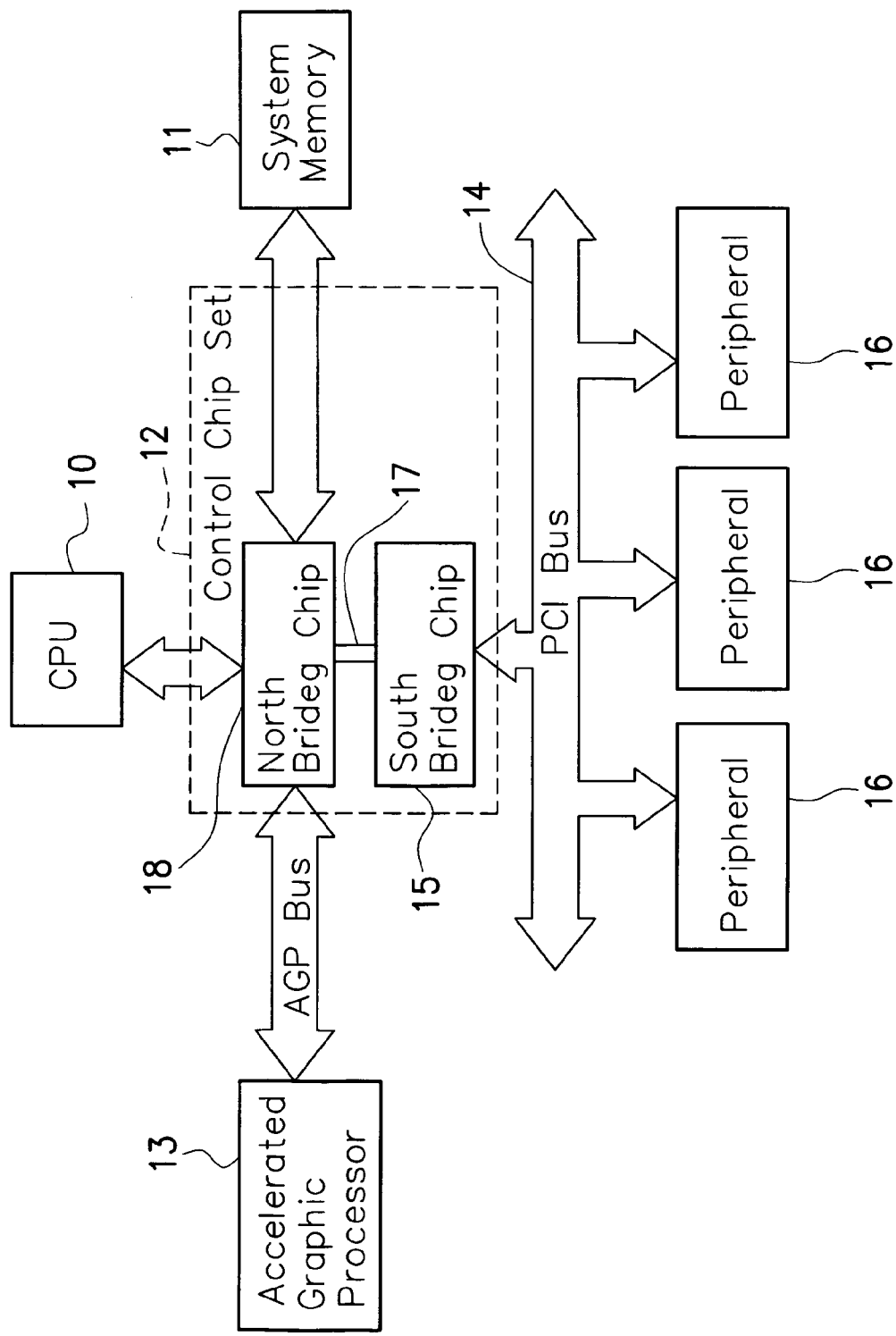
FIG. 1 shows a block diagram of prior art including computer structure.
Figure 2:
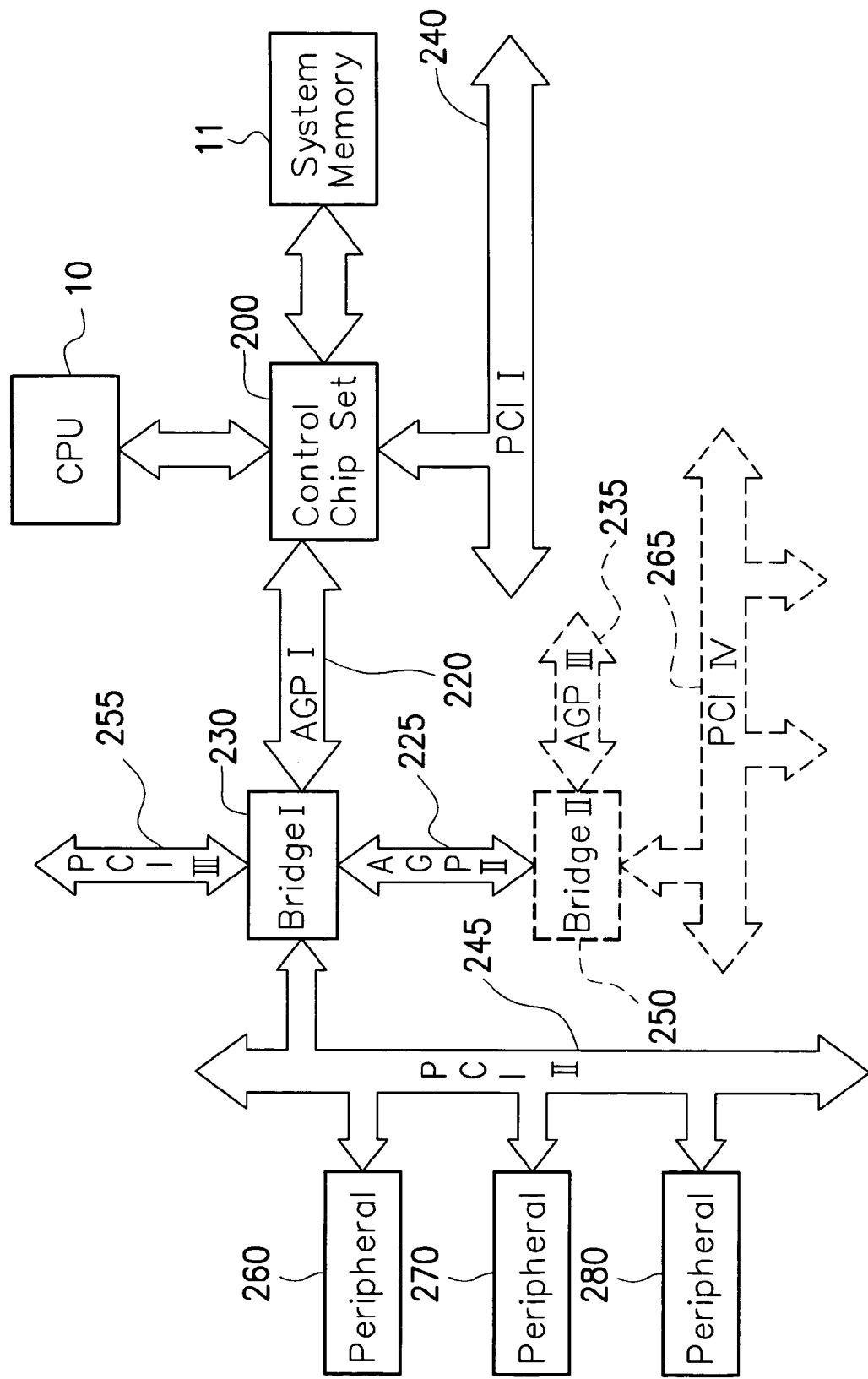
FIG. 2 shows a block diagram of an extended bus which is actually an expanded accelerated graphics port bus, according to an aspect of the present invention.

FIG. 2 shows a block diagram of an extended bus of an expanded accelerated graphics port bus, according to an aspect of the present invention. The structure of the extended bus comprises at least an accelerated graphics port bus I 220, a bridge I 230, and a first extended bus. The first extended bus comprises an accelerated graphics port bus II 225 and a second extended bus such as a PCI bus III 255.

The bridge I 230 is coupled to both the accelerated graphics port bus I 220 and a PCI bus II 245. The signal and data of the accelerated graphics port bus I 220 are compatibly converted to the PCI bus II 245 by the bridge I 230. Similarly, the signal and data of the accelerated graphics port bus I 245 are converted to the accelerated graphics port bus I 220. Thus, the accelerated graphics port bus I 220 can be expanded to obtain the PCI bus II 245. The peripherals 260, 270 and 280 inserted in the PCI bus II 245 can thus access the memory 11 via the bridge I 230, the accelerated graphics port bus I 220 and the control chip set 200. The central processing unit 10 can then control the peripherals 260, 270 and 280 via the control chip set 200, the accelerated graphics port bus I 220, the bridge I 230 and the PCI bus II 245.

In one embodiment of the invention, the bridge I 230 is further coupled to the accelerated graphics port bus II 225 and the PCI bus III 255. By the bridge I 230, the signal and data of the accelerated graphics port bus I 220 and the accelerated graphics port bus II 255 are mutually and compatibly converted and buffered to retain the accelerated graphics port bus for the computer system. Similarly, the bridge I 230 further compatibly converts the data and signal of the accelerated graphics port bus I 220 and the PCI bus III 255, so that an additional extended bus is obtained.

Furthermore, the bridge I 230 can be connected to another bridge II 250 to further expand the accelerated graphics port bus II 225 and to obtain a third or fourth extended bus, for example, a PCI bus IV 265, or the third accelerated graphics port bus III 235.

Figure 3:
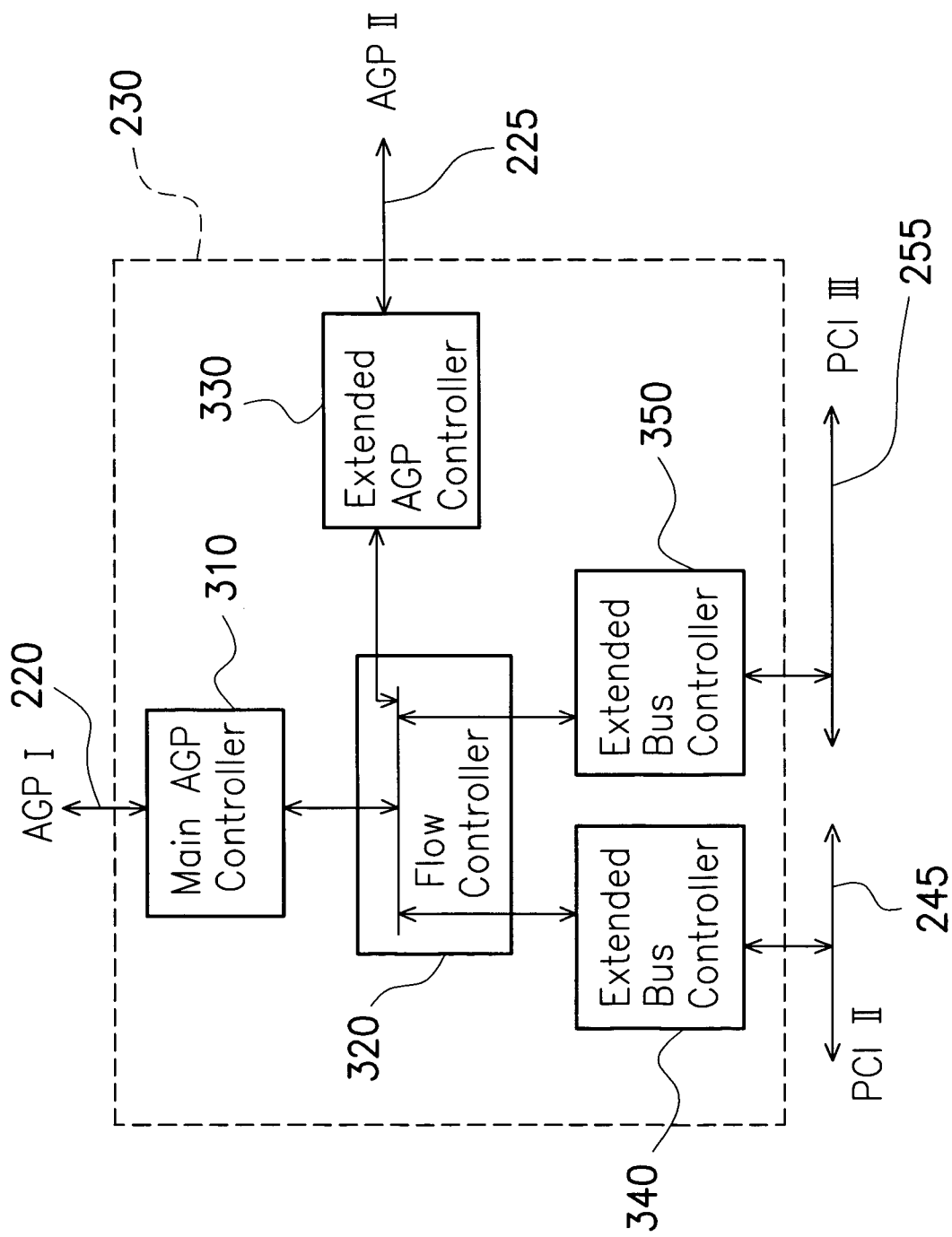
FIG. 3 is a block diagram showing the bridge, according to an aspect of the present invention.

FIG. 3 is a block diagram showing the bridge. The bridge I 230 is mainly used to expand the accelerated graphics port bus I 220 to obtain the PCI bus II 245. The bridge I 230 comprises a main accelerated graphics port controller 310, an extended bus controller 340 and a flow controller 320. The main accelerated graphics port controller 310 is coupled to the accelerated graphics port bus I 220 to receive compatibly and transmit the signal and data of the PCI bus II 245. The flow controller 320 is coupled to the main accelerated graphics port controller 310 and the extended bus controller 340 to arbitrate and control the flow direction of the data and signal of the controllers 310 and 340.

The bridge I 230 may further comprise an extended accelerated graphics port controller 330 and a second extended bus controller 350. The extended accelerated graphics port controller 330 is coupled to the accelerated graphics port bus II 225 and the flow controller 320. The extended accelerated graphics port controller 330 compatibly receives and transmits the data and signal of the accelerated graphics port bus II 225. The extended bus controller 350 is coupled to the PCI bus III 255 and the flow controller 320 to receive compatibly and transmit the data and signal of the PCI bus III 255. The flow controller 320 arbitrates and controls the flow direction of the data and signal of the above controllers.

An alternative embodiment of the novel aspects of the present invention may include other connected bus which are combined with the bridge disclosed herein in order to extend other connected interface. Since those skilled in the art are ware of techniques for replacing other connected bus, the details of such an embodiment will not be described herein.

As the above description, the invention provides a method for expanding an accelerated graphics port bus I 220 with an extended bus. A PCI bus II 245 is provided. The data and signal of the accelerated graphics port bus I 220 and the PCI bus are compatibly and mutually converted. In most of the applications, an accelerated graphics port bus II 225 is further provided. The data and signal of the accelerated graphics port buses I 220 and II 225 are compatibly and mutually converted and buffered. A PCI bus III 255 is further provided, and the data and signal of the PCI bus III 255 and the accelerated graphics port bus I 220 are then mutually and compatibly converted.

As the accelerated graphics port bus is a point-to-point bus, the clock frequency thereof is very high and the bandwidth is wide. The accelerated graphics port bus has been proved a stable bus. Thus, the bridge in the structure of the extended bus extends and expands an accelerated graphics port bus to obtain one or more extended buses. More slots are thus provided to the system. The flexibility for expanding the computer system is increased. This invention is particularly advantageous for a server requiring various high-speed peripherals.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An extended bus structure, coupling with a control chip set via a first accelerated graphics port bus, the control chip set also coupled with an original system bus, the extended bus structure comprising:
   a first extended bus for expanding the first accelerated graphics port bus;
   a second accelerated graphics port bus for expanding the first accelerated graphics port bus; and
   a first bridge, coupled to the control chip set via the first accelerated graphics port bus and further coupled to the second accelerated graphics port bus and the first extended bus for converting mutually and compatibly signal and data between the first and second accelerated graphics port buses and the first extended bus, wherein the first accelerated graphics port bus is at least expanded into the first extended bus and the first and second accelerated graphics port buses.

2. The extended bus structure of claim 1, wherein the first bridge comprises:
 a main accelerated graphics port controller coupled to the first accelerated graphics port bus for compatibly receiving and transmitting data and signal thereof;
 a first extended bus controller coupled to the first extended bus for compatibly receiving and transmitting data and signal thereof;
 an extended accelerated graphics port controller coupled to the second accelerated graphics port bus for compatibly receiving and transmitting data and signal of the second accelerated graphics port bus; and
 a flow controller coupled to the main accelerated graphics port controller, the extended accelerated graphics port controller, and the first extended bus controller for arbitrating and controlling flow direction of data and signal into/from the main accelerated graphics port controller, the extended accelerated graphics port controller, and the first extended bus controller.

3. The extended bus structure of claim 1, further comprising:
 a second bridge coupled to the first bridge via the second accelerated graphics port bus for expanding the first accelerated graphics port bus, the second bridge further coupled to a third accelerated graphics port bus and a third extended bus.

4. The extended bus structure of claim 2, further comprising:
 a second extended bus, coupled to the first bridge to expand the first accelerated graphics port bus; and
 wherein the first bridge further comprises a second extended bus controller coupled to the flow controller and the second extended bus for compatibly receiving and transmitting data and signal of the second extended bus and the flow controller arbitrates and controls flow direction of data and signal into/from the second extended bus controller.

5. A bridge converting signals between a first and second accelerated graphics port buses and a first extended bus, comprising:
 a main accelerated graphics port controller coupled to the first accelerated graphics port bus for compatibly receiving and transmitting data and signal thereof;
 a first extended bus controller coupled to the first extended bus for compatibly receiving and transmitting data and signal thereof;
 an extended accelerated graphics port controller coupled to the second accelerated graphics port bus for compatibly receiving and transmitting data and signal of the second accelerated graphics port bus; and
 a flow controller coupled between the main and the extended accelerated graphics port controllers and the first extended bus controller for arbitrating and controlling flow direction of data and signal into/from the main and the extended accelerated graphics port controllers and the first extended bus controller.

6. The bridge of claim 5, further comprising:
 a second extended bus controller coupled to a second extended bus and the flow controller for compatibly receiving and transmitting data and signal of the second extended bus, wherein the flow controller arbitrates and controls flow direction of data and signal into/from the second extended bus controller.

* * * * *